(12) United States Patent
Watanabe et al.

(10) Patent No.: US 9,121,322 B2
(45) Date of Patent: Sep. 1, 2015

(54) ELECTRICALLY HEATED CATALYST

(75) Inventors: Takashi Watanabe, Gotemba (JP);
Mamoru Yoshioka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 13/695,532

(22) PCT Filed: Aug. 31, 2010

(86) PCT No.: PCT/JP2010/064804
§ 371 (c)(1),
(2), (4) Date: Oct. 31, 2012

(87) PCT Pub. No.: WO2012/029124
PCT Pub. Date: Mar. 8, 2012

(65) Prior Publication Data
US 2013/0055702 A1   Mar. 7, 2013

(51) Int. Cl.
*B01D 50/00* (2006.01)
*F01N 3/20* (2006.01)

(52) U.S. Cl.
CPC ............ *F01N 3/2026* (2013.01); *F01N 3/2013* (2013.01); *Y02T 10/26* (2013.01)

(58) Field of Classification Search
CPC ... F01N 3/2026; F01N 3/2053; F01N 3/2046; F01N 3/2013; F01N 3/2853; Y02T 10/26
USPC ................................. 422/174, 179
See application file for complete search history.

(56) References Cited

U.S. PATENT DOCUMENTS 4,976,929 A      12/1990  Cornelison et al.
5,070,694 A  *   12/1991  Whittenberger ................ 60/300
(Continued)

FOREIGN PATENT DOCUMENTS

CN      102985653       3/2013
JP       05231140       9/1993
(Continued)

OTHER PUBLICATIONS

International Search Report Issued Dec. 7, 2012 in PCT/JP10/64804 Filed Aug. 31, 2010.
(Continued)

*Primary Examiner* — Tom P Duong
(74) *Attorney, Agent, or Firm* — Oblon, McClelland, Maier & Neustadt, L.L.P.

(57) ABSTRACT

The present invention is intended to suppress a decrease in insulation resistance between electrodes and a case in an electrically heated catalyst (EHC). The EHC according to the present invention is provided with a heat generation element that is electrically energized to generate heat thereby to heat a catalyst, a case that receives a heat generation element therein, an insulating member that is arranged between the heat generation element and the case for insulating electricity, electrodes that are connected to the heat generation element through an electrode chamber which is a space located between an inner wall surface of the case and an outer peripheral surface of the heat generation element, and a communication passage that makes communication between a portion of an exhaust system of the internal combustion engine, which is other than a portion thereof in which the electrically heated catalyst is arranged, and the electrode chamber.

4 Claims, 3 Drawing Sheets

UPSTREAM SIDE                DOWNSTREAM SIDE

(56) References Cited

U.S. PATENT DOCUMENTS

| | | |
|---|---|---|
| 5,177,961 A | 1/1993 | Whittenberger |
| 5,238,650 A | 8/1993 | Sheller et al. |
| 5,264,186 A * | 11/1993 | Harada et al. ............ 422/171 |
| 5,744,104 A | 4/1998 | Sakurai et al. |
| 5,839,276 A | 11/1998 | Nishizawa |
| 5,935,473 A | 8/1999 | Hashimoto et al. |
| 8,658,103 B2 | 2/2014 | Mutsuda et al. |
| 2011/0131962 A1 | 6/2011 | Toi et al. |
| 2012/0047881 A1 | 3/2012 | Kumagai et al. |
| 2012/0131907 A1 | 5/2012 | Yoshioka et al. |
| 2013/0156651 A1 | 6/2013 | Yoshioka et al. |

FOREIGN PATENT DOCUMENTS

| | | |
|---|---|---|
| JP | 5 269387 | 10/1993 |
| JP | 5-96421 | 12/1993 |
| JP | 05-096424 | 12/1993 |
| JP | 05-317651 | 12/1993 |
| JP | 06-002534 | 1/1994 |
| JP | 08210127 | 8/1996 |
| JP | 2007 239556 | 9/2007 |
| JP | 2008 14186 | 1/2008 |
| JP | 2010-059960 | 3/2010 |
| JP | 2010-071223 | 4/2010 |
| JP | 2010-242724 | 10/2010 |
| JP | 2012-112302 | 6/2012 |

OTHER PUBLICATIONS

Non-Final Office Action issued in U.S. Appl. No. 13/146,267 on May 15, 2014 (17 pages).

Notice of Allowance issued in U.S. Appl. No. 13/146,267 on Sep. 12, 2014.

Office Action mailed Jul. 7, 2014, in co-pending U.S. Appl. No. 13/820,673.

Notice of Allowance issued in U.S. Appl. No. 13/820,673 on Dec. 26, 2014.

Corrected Notice of Allowability issued in U.S. Appl. No. 13/146,267 on Dec. 26, 2014.

* cited by examiner

ELECTRICALLY HEATED CATALYST

TECHNICAL FIELD

The present invention relates to an electrically heated catalyst that is arranged in an exhaust passage of an internal combustion engine.

BACKGROUND ART

In the past, as an exhaust gas purification catalyst arranged in an exhaust passage of an internal combustion engine, there has been developed an electrically heated catalyst (hereinafter referred to as an EHC) in which a catalyst is heated by means of a heat generation element which generates heat by electrical energization thereof.

In the EHC, an insulating member, which serves to insulate electricity, is arranged between the heat generation element which generates heat by electrical energization thereof, and a case in which the heat generation element is received. For example, in a Patent Document 1, there is disclosed a technique in which in an EHC, a mat of an insulating material is arranged between a carrier which is electrically energized to generate heat and a case in which the carrier is received. Due to the arrangement of such an insulating member, it is possible to suppress the heat generation element and the case from being short-circuited to each other.

PRIOR ART DOCUMENTS

Patent Documents

Patent Document 1: Japanese patent application laid-open No. H05-269387

SUMMARY OF THE INVENTION

Problems to be Solved by the Invention

Inside the case of the heat generation element in the EHC, there is formed an electrode chamber which is a space for passing or inserting electrodes connected to the heat generation element. The insulating member and the heat generation element together constitute a wall surface of the electrode chamber.

The exhaust gas flowing in an exhaust pipe permeates into the insulating member and the heat generation element. Into the electrode chamber formed as described above, the exhaust gas, which has passed through or along the insulating member or the outer peripheral wall of the heat generation element, comes. Moisture is contained in the exhaust gas, and hence, when the exhaust gas comes into the electrode chamber, condensed water may be generated in the electrode chamber due to the condensation of the moisture in the exhaust gas.

In addition, in the exhaust pipe, too, condensed water may be generated due to the condensation of the moisture in the exhaust gas on a wall surface of the exhaust pipe. When the condensed water is generated inside the exhaust pipe, it is forced by the exhaust gas to flow along the inner wall surface of the exhaust pipe. Then, at the time when the condensed water reaches the EHC, it permeates into the insulating member and the heat generation element. When the condensed water permeates into the insulating member and the heat generation element, the condensed water having passed through them as well as water vapor generated by the evaporation of the condensed water in the insides of the insulating member and the heat generation element may come into the electrode chamber.

The electrode chamber is a space surrounded by the heat generation element, the insulating member and the like, inside the case. For that reason, the condensed water or water vapor, which has been generated in the electrode chamber or permeated into the electrode chamber, stays easily in the electrode chamber. When the humidity in the electrode chamber rises excessively with the water vapor, there is a fear that the insulation resistance between the electrodes in the electrode chamber and the case may decrease to a large extent. In addition, when the condensed water exists in the electrode chamber, there is also another fear that the electrodes and the case may be short-circuited by the condensed water itself. If the insulation resistance between the electrodes and the case decreases to a large extent, it will become difficult to raise the temperature of the heat generation element to a sufficient extent by means of electrical energization. As a result, there will be a fear that the exhaust gas purification capacity of the EHC may be caused to decrease.

The present invention has been made in view of the above problems, and has for its object to suppress a decrease in the insulation resistance between electrodes and a case in an EHC.

Means for Solving the Problems

The present invention is provided with a communication passage for making communication between an electrode chamber and an exhaust passage.

More specifically, an EHC according to the present invention is an electrically heated catalyst which is arranged in an exhaust passage of an internal combustion engine, said catalyst comprising:

a heat generation element that is electrically energized to generate heat so that a catalyst is heated by the generation of heat;

a case that receives said heat generation element therein;

an insulating member that is arranged between said heat generation element and said case to support said heat generation element and to insulate electricity;

electrodes that are connected to said heat generation element through an electrode chamber which is a space located between an inner wall surface of said case and an outer peripheral surface of said heat generation element, and which has a side wall surface formed by said insulating member, said electrodes supplying electricity to said heat generation element; and a communication passage that makes communication between a portion of an exhaust system of the internal combustion engine, which is other than a portion thereof in which the electrically heated catalyst is arranged, and said electrode chamber.

According to the present invention, the provision of the communication passage permits the electrode chamber to be ventilated. For that reason, it is possible to suppress the humidity in the electrode chamber from rising. In addition, it is possible to suppress condensed water from staying in the electrode chamber. Thus, it is possible to suppress a decrease in the insulation resistance between the electrodes and the case in the electrode chamber, which would otherwise result from the condensed water or water vapor therein.

In the present invention, the communication passage may be constructed so as to make communication between a portion of the exhaust passage at the downstream side of the electrically heated catalyst and said electrode chamber. In this case, the exhaust gas introduced into the electrode chamber through the communication passage can be made an exhaust gas which has been purified by the EHC. As a result of this, it is possible to suppress the corrosion of the electrodes and the contamination of the electrode chamber.

In the EHC according to the present invention, the communication passage may be arranged in plurality. According to this, it is possible to facilitate the ventilation of the electrode chamber to a further extent.

Advantageous Effect of the Invention

According to the present invention, a decrease in the insulation resistance between the electrodes and the case in the EHC can be suppressed.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

<First Embodiment>

[Schematic Construction of an EHC]

Figure 1:
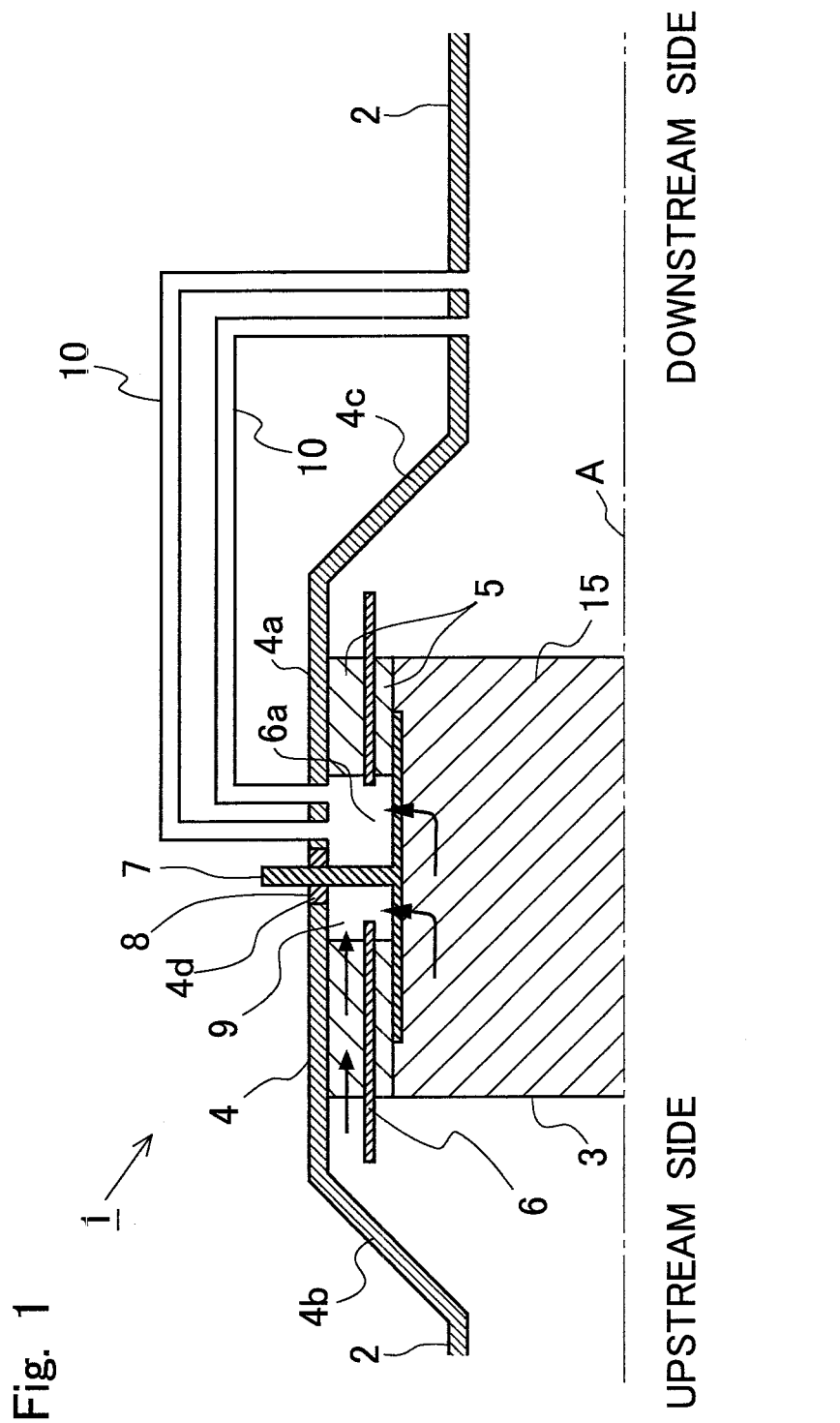
[FIG. 1] is a view showing the schematic construction of an EHC according to a first embodiment.

FIG. 1 is a view showing the schematic construction of an electrically heated catalyst (EHC) according to this first embodiment of the present invention. The EHC 1 according to this embodiment is arranged in an exhaust pipe of an internal combustion engine mounted on a vehicle. The internal combustion engine may be a diesel engine, or may be a gasoline engine. In addition, the EHC 1 according to this embodiment can also be used in a vehicle which adopts a hybrid system equipped with an electric motor.

FIG. 1 is a cross sectional view which shows the EHC 1 cut in a longitudinal direction thereof along a central axis A of an exhaust pipe 2 of the internal combustion engine. Here, note that the shape of the EHC 1 is in line symmetry with respect to the central axis A, and hence, in FIG. 1, only an upper part of the EHC 1 is shown for the sake of convenience.

The EHC 1 according to this embodiment is provided with a catalyst carrier 3, a case 4, a mat 5, an inner pipe 6, electrodes 7, and communication passages 10. The catalyst carrier 3 is formed in the shape of a circular cylinder, and is arranged in such a manner that a central axis thereof is in alignment with the central axis A of the exhaust pipe 2. An exhaust gas purification catalyst 15 is carried or supported by the catalyst carrier 3. As the exhaust gas purification catalyst 15, there can be exemplified an oxidation catalyst, an NOx storage reduction catalyst, an NOx selective reduction catalyst, a three-way catalyst, and so on.

The catalyst carrier 3 is formed of a material which, when electrically energized, becomes an electric resistance to generate heat. As a material for the catalyst carrier 3, there can be exemplified SiC. The catalyst carrier 3 has a plurality of passages which extend in a direction in which an exhaust gas flows (i.e., the direction of the central axis A), and which have a cross section of honeycomb shape vertical to the direction in which the exhaust gas flows. The exhaust gas flows through these passages. Here, note that the cross sectional shape of the catalyst carrier 3 in the direction orthogonal to the central axis A may be elliptical, etc. The central axis A is a central axis common to the exhaust pipe 2, the catalyst carrier 3, the inner pipe 6, and the case 4.

The catalyst carrier 3 is received in the case 4. An electrode chamber 9 is formed in the case 4. One pair of electrodes 7 only one electrode being illustrated in FIG. 1) are connected to the catalyst carrier 3 through the electrode chamber 9. Electricity is supplied to the electrodes 7 from a battery (not shown). When electricity is supplied to the electrode 7, the catalyst carrier 3 is electrically energized. When the catalyst carrier 3 generates heat by electrical energization thereof, the exhaust gas purification catalyst 15 supported by the catalyst carrier 3 is heated, so that the activation thereof is facilitated.

The case 4 is formed of metal. As a material which forms the case 4, there can be exemplified a stainless steel material. The case 4 has a receiving portion 4a which is constructed to include a curved surface parallel to the central axis A, and tapered portions 4b, 4c which serve to connect the receiving portion 4a and the exhaust pipe 2 with each other at the upstream side and the downstream side, respectively, of the receiving portion 4a. The receiving portion 4a has a channel cross section which is larger than that of the exhaust pipe 2, and the catalyst carrier 3, the mat 5, and the inner pipe 6 are received in the inside of the receiving portion 4a. The tapered portions 4b, 4c each take a tapered shape of which the channel cross section decreases in accordance with the increasing distance thereof from the receiving portion 4a.

The mat 5 is inserted between an inner wall surface of the receiving portion 4a of the case 4, and an outer peripheral surface of the catalyst carrier 3. In other words, inside the case 4, the catalyst carrier 3 is supported by the mat 5. In addition, the inner pipe 6 is inserted in the mat 5. In other words, the mat 5 is divided into a portion at the side of the case 4 and a portion at the side of the catalyst carrier 3 by means of the inner pipe 6.

The mat 5 is formed of an electrically insulating material. As a material which forms the mat 5, there can be exemplified a ceramic fiber which includes alumina as a main component. The mat 5 is wound around the outer peripheral surface of the catalyst carrier 3 and an outer peripheral surface of the inner pipe 6. Due to the insertion of the mat 5 between the catalyst carrier 3 and the case 4, it is possible to suppress electricity from flowing into the case 4 at the time when the catalyst carrier 3 is electrically energized.

The inner pipe 6 is formed of an electrically insulating material. Alumina can be exemplified as a material which forms the inner pipe 6. The inner pipe 6 is formed into a tubular shape with the central axis A being located as a center thereof. As shown in FIG. 1, the inner pipe 6 has a length in the direction of the central axis A longer than that of the mat 5. As a result, the inner pipe 6 has an upstream side end and a downstream side end thereof protruded from an upstream side end face and a downstream side end face of the mat 5, respectively.

The case 4 and the inner pipe 6 have through holes 4d, 6a opened therein so as to allow the electrodes 7 to pass them, respectively. In addition, the mat 5 has a space formed therein so as to allow the electrodes 7 to pass therethrough. The electrode chamber 9 is formed by such a space which is located between an inner wall surface of the case 4 and the outer peripheral surface of the catalyst carrier 3, and which has a side wall surface thereof formed by the mat 5.

Support members 8, which serve to support the electrodes 7, respectively, are arranged in the through holes 4d which are opened in the case 4. The support members 8 are formed of an electrically insulating material, and are fitted with no gap between the case 4 and the electrodes 7.

In addition, the EHC 1 is provided with the communication passages 10 for placing the electrode chamber 9 and the exhaust pipe 2 in fluid communication with each other. Each of the two communication passages 10 has one end thereof connected to the electrode chamber 9, and the other end thereof connected to the exhaust pipe 2 at a location downstream of the EHC 1.

Here, note that in cases where a pair of electrode chambers 9 are separately formed corresponding to the pair of the electrodes 7, respectively, two communication passages 10 are provided for each of the electrode chambers 9. In other words, one ends of two communication passages are connected to one electrode chamber which is formed corresponding to a plus side or positive electrode, and one ends of another two communication passages are also connected to another electrode chamber which is formed corresponding to a minus side or negative electrode. Then, any of the communication passages is connected to the exhaust pipe 2 at a location downstream of the EHC 1.

An electrode chamber 9 may be formed over the entire circumference of a side surface of the catalyst carrier 3. In this case, the plus side electrode and the minus side electrode are connected to the catalyst carrier 3 through the single electrode chamber. Thus, in cases where the single electrode chamber is common with the plus side electrode and the minus side electrode (or in cases where an electrode chamber corresponding to the plus side electrode and an electrode chamber corresponding to the minus side electrode are connected with each other to form a single electrode chamber), two communication passages should be connected to this single electrode chamber.

In this embodiment, the catalyst carrier 3 corresponds to a heat generation element according to the present invention. However, the heat generation element according to the present invention is not limited to a carrier which supports a catalyst, but instead the heat generation element may be a structure which is arranged at the upstream side of a catalyst, for example. In addition, in this embodiment, the case 4 corresponds to a case according to the present invention, and the mat 5 corresponds to an insulating member according to the present invention. Also, in this embodiment, the communication passages 10 correspond to communication passages according to the present invention.

[Operational Effects of the Construction of the EHC according to this Embodiment]

In FIG. 1, arrows indicate flows of exhaust gas, condensed water, and water vapor which has been generated due to the evaporation of the condensed water. The exhaust gas flowing in the exhaust pipe 2 permeates into the mat 5 and the catalyst carrier 3. When the exhaust gas passes through the outer peripheral wall of the catalyst carrier 3 or the mat 5 and comes into the electrode chamber 9, the moisture in the exhaust gas may condense, thus generating condensed water inside the electrode chamber 9.

In addition, when condensed water is generated in the exhaust pipe 2 and this condensed water permeates into the mat 5 or the catalyst carrier 3, the condensed water stays inside the mat 5 or the catalyst carrier 3. Then, when the amount of the condensed water, which has stayed inside the mat 5 or the catalyst carrier 3, increases, the condensed water may come into the electrode chamber 9. Also, when the temperature of the exhaust gas rises, the condensed water, which has stayed inside the mat 5 or the catalyst carrier 3, may evaporate, so that the condensed water may come into the electrode chamber 9 in a state of water vapor.

When the electrode chamber 9 is a closed space that is surrounded by the inner wall surface of the case 4, the side surface of the catalyst carrier 3 and the mat 5, the condensed water or water vapor, which has been generated in the electrode chamber 9 or has come into the electrode chamber 9, is apt to stay in this electrode chamber 9. Then, when the condensed water exists in the electrode chamber 9, there is a fear that the electrodes 7 and the case 4 may be short-circuited by the condensed water.

Figure 2:
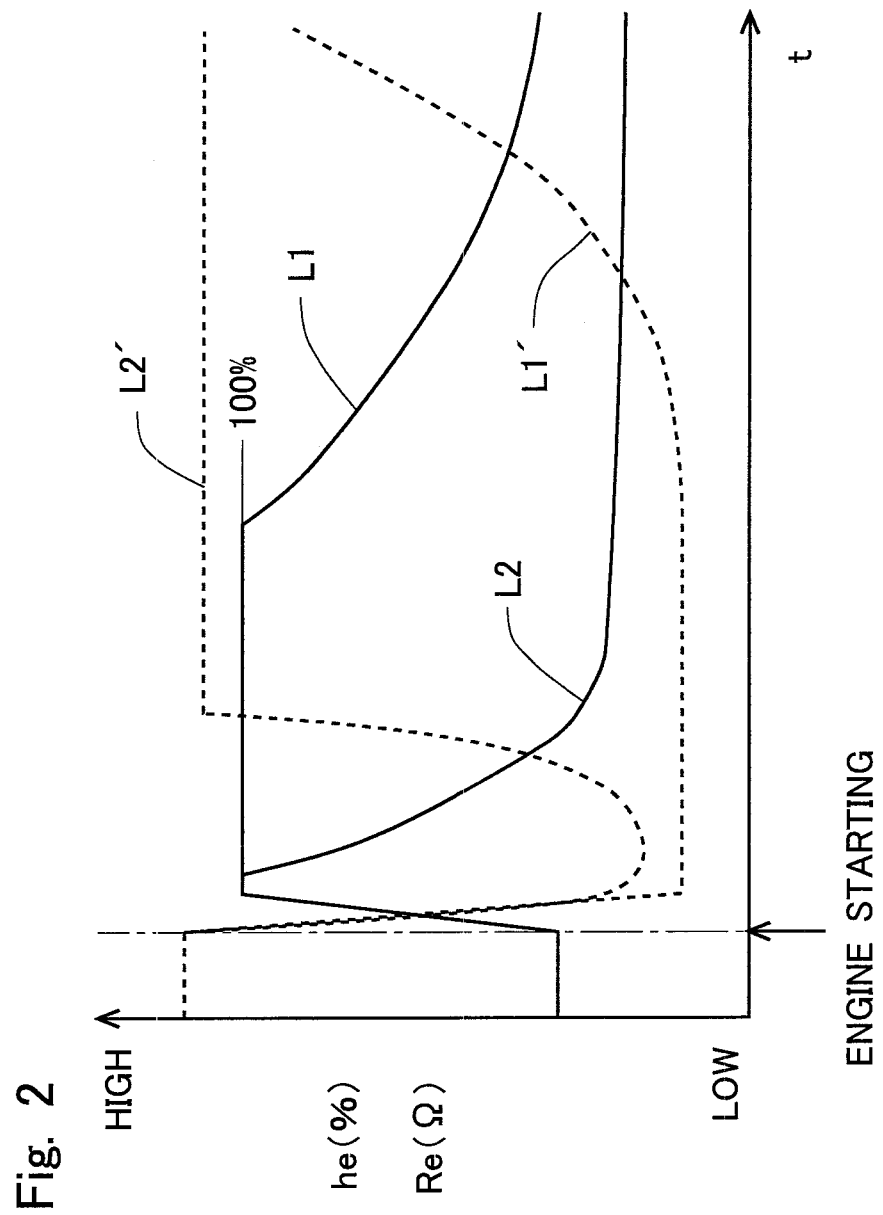
[FIG. 2] is a view showing temporal changes of humidity in an electrode chamber and an insulation resistance between electrodes and a case in the electrode chamber, from the time of starting of an internal combustion engine according to the first embodiment.

In addition, when water vapor stays in the electrode chamber 9, the humidity in the electrode chamber 9 becomes high. FIG. 2 is a view showing the temporal changes of the humidity in the electrode chamber 9 and the insulation resistance between the electrodes 7 and the case 4 in the electrode chamber 9 from the time of starting of the internal combustion engine. In FIG. 2, the axis of ordinate represents the humidity he in the electrode chamber 9, or the insulation resistance Re between the electrodes 7 and the case 4 in the electrode chamber 9, and the axis of abscissa represents time t. In FIG. 2, solid lines L1, L2 indicate the change over time of the humidity he in the electrode chamber 9. Also, a broken line L1' indicates the change over time of the insulation resistance Re between the electrodes 7 and the case 4 in the electrode chamber 9 at the time when the humidity he in the electrode chamber 9 changes as shown by the solid line L1. A broken line L2' indicates the change over time of the insulation resistance Re between the electrodes 7 and the case 4 in the electrode chamber 9 at the time when the humidity he in the electrode chamber 9 changes as shown by the solid line L2.

If the temperature of the exhaust gas goes up quickly after starting of the internal combustion engine, the amount of generation of condensed water will be small, so the humidity he in the electrode chamber 9 will drop quickly, as shown by the solid line L2. In this case, as shown by the broken line L2', the insulation resistance Re between the electrodes 7 and the case 4 will rise quickly in accordance with the drop in the humidity he in the electrode chamber 9, and will be maintained at a high level. On the other hand, in cases where the temperature of the exhaust gas goes up and down in a repeated manner after starting of the internal combustion engine, the amount of generation of condensed water will increase, so the humidity he in the electrode chamber 9 will become high, as shown by the solid line L1. In this case, the insulation resistance Re between the electrodes 7 and the case 4 drops to a large extent, as shown by the broken line L1'.

In this manner, if the insulation resistance between the electrodes 7 and the case 4 drops to a large extent resulting from the condensed water or the water vapor, it will become difficult to raise the temperature of the catalyst carrier 3 to a sufficient extent by means of electrical energization. As a result, it will become difficult to heat the exhaust gas purification catalyst 15 to a sufficient extent, thus giving rise to a fear that the exhaust gas purification capacity of the EHC 1 may be caused to drop.

Accordingly, in this embodiment, the communication passages 10 are provided in the EHC 1 in order to ventilate the electrode chamber 9. As mentioned above, the other ends of the communication passages 10 are connected to the exhaust pipe 2. Therefore, it is possible to carry out ventilation between the electrode chamber 9 and the exhaust pipe 2 by way of the communication passages 10. According to this, it is possible to suppress the water vapor from staying in the electrode chamber 9. As a result, it is possible to suppress the humidity in the electrode chamber 9 from rising, and the condensed water from staying in the electrode chamber 9. Thus, according to this embodiment, it is possible to suppress a decrease in the insulation resistance between the electrodes 7 and the case 4 in the electrode chamber 9, which would otherwise result from the condensed water or water vapor therein.

Here, note that in this embodiment, the connection positions of the other ends of the communication passages 10 are not necessarily limited to a portion in the exhaust pipe 2 at the downstream side of the EHC 1. For example, the other ends of the communication passages may be connected to a portion in the exhaust pipe 2 at the upstream side of the EHC 1, or connected to an exhaust manifold, etc., to which the exhaust pipe 2 is connected.

However, because the other ends of the communication passages 10 are connected to the portion in the exhaust pipe 2 at the downstream side of the EHC 1, as shown in FIG. 1, the exhaust gas introduced into the electrode chamber 9 through the communication passages 10 can be made an exhaust gas which has been purified by the EHC 1. As a result of this, the corrosion of the electrodes 7 by acidic components contained in the exhaust gas as well as the contamination of the electrode chamber 9 by organic components contained in the exhaust gas can be suppressed.

In addition, in this embodiment, the number of communication passages does not necessarily need to be two, but three or more communication passages may be provided. Also, the number of communication passages may be one. Even if the number of communication passages is one, the coming in and out of gas occurs between the inside of the electrode chamber 9 and the inside of the exhaust pipe 2 due to a pressure difference between the inside of the exhaust pipe 2 and the inside of the electrode chamber 9 generated by the pulsation of the exhaust gas in the exhaust pipe 2, and/or a difference in temperature therebetween, whereby the electrode chamber 9 can be ventilated.

However, due to the provision of the plurality of communication passages 10, as shown in FIG. 1, when exhaust gas is introduced into the electrode chamber 9 from the exhaust pipe 2 passing through one of the communication passages 10, it becomes easy for the exhaust gas (moisture) in the electrode chamber 9 to be discharged therefrom, while passing through the other communication passage 10. Accordingly, the provision of the plurality of communication passages can serve to facilitate the ventilation of the electrode chamber 9 to a further extent.

[Other Constructions]

In this embodiment, exhaust gas purification catalysts may be arranged in the communication passages 10, respectively. According to this, the exhaust gas introduced into the electrode chamber 9 through the communication passages 10 can be purified to a further extent. It is preferable that the exhaust gas purification catalysts, which are arranged in the communication passages 10, respectively, be able to reduce the acidic components contained in the exhaust gas, and be able to oxidize the organic components contained in the exhaust gas.

Particulate filters, which serve to trap the particulate matter in the exhaust gas, may also be arranged in the communication passages 10, respectively. According to this, it is possible to suppress the particulate matter from coming into the electrode chamber 9 through the communication passages 10.

Moisture trapping members, which serve to absorb or adsorb the moisture in the exhaust gas, may be arranged in the communication passages 10, respectively. According to this, it is possible to suppress the moisture from coming into the electrode chamber 9 through the communication passages 10.

<Second Embodiment>

[Schematic Construction of an EHC]

Figure 3:
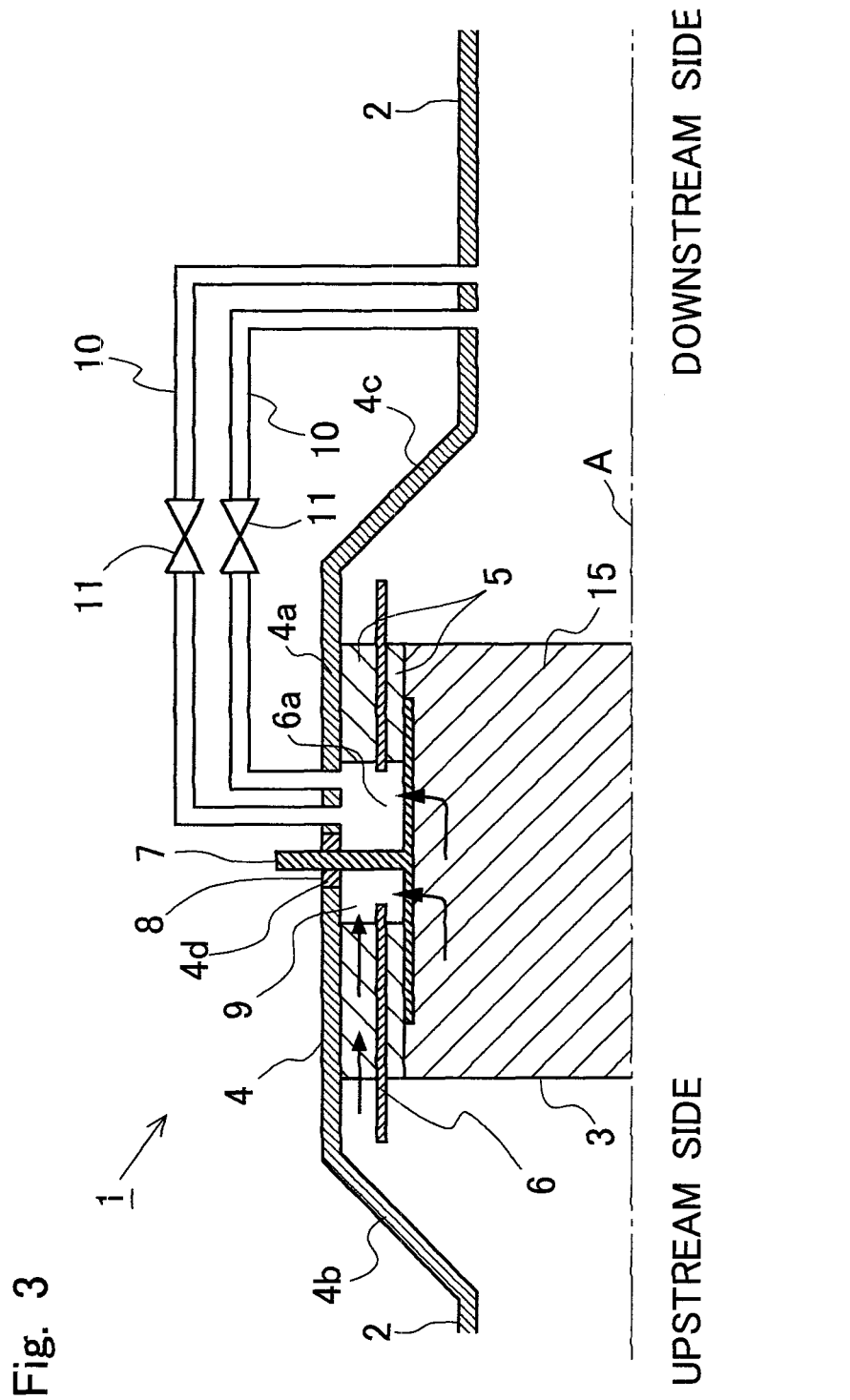
[FIG. 3] is a view showing the schematic construction of an EHC according to a second embodiment.

FIG. 3 is a view showing the schematic construction of an EHC according to this second embodiment. In this embodiment, communication control valves 11, which serve to open or block two communication passages 10, are arranged in the two communication passages 10, respectively. The communication control valves 11 are electrically connected to an electronic control unit (ECU: not shown). The communication control valves 11 are controlled by the ECU. When the communication control valves 11 are closed, the communication passages 10 are opened, whereas when the communication control valves 11 are closed, the communication passages 10 are blocked or closed. The construction other than the communication control valves 11 is the same as that of the EHC according to the first embodiment.

[Communication Control]

Moisture is also contained in the exhaust gas which is introduced into the electrode chamber 9 from the exhaust pipe 2 through the communication passages 10. Accordingly, in this embodiment, when there is a high possibility that the moisture in the exhaust gas introduced from the exhaust pipe 2 into the electrode chamber 9 through the communication passages 10 will condense in the electrode chamber 9, the communication passages are blocked by the communication control valves 11, respectively, so that the introduction of the exhaust gas is inhibited. Then, when there is a low possibility that the moisture in the exhaust gas introduced from the exhaust pipe into the electrode chamber 9 through the communication passages 10 will condense in the electrode chamber 9, the communication passages 10 are opened by the communication control valves 11, respectively, so that the ventilation of the electrode chamber 9 is carried out.

For example, in cases where the internal combustion engine has been cold started, the temperature in the electrode chamber 9 is low until the warming-up of the internal combustion engine is completed, so the moisture in the exhaust gas is liable to condense in the electrode chamber 9. Accordingly, the communication control valves 11 are closed until the warming-up of the internal combustion engine is completed, and the communication control valves 11 are opened after the completion of the warming-up.

According to such communication control, the generation of condensed water in accordance with the ventilation of the electrode chamber 9 can be suppressed. Thus, it is possible to suppress a decrease in the insulation resistance between the electrodes 7 and the case 4 in the electrode chamber 9 with a higher degree of probability, which would otherwise result from the condensed water or water vapor therein.

In this embodiment, a temperature sensor, which serves to detect the temperature in the electrode chamber 9, may be arranged in the electrode chamber 9. In addition, a moisture concentration sensor, which serves to detect the moisture concentration of the exhaust gas introduced into the electrode chamber 9 through the communication passages 10, may be arranged in one or each of the communication passages 10, or in the vicinity of connection portions of the communication passages 10 in the exhaust pipe 2. In cases where these sensors are provided, a determination may be made, based on the temperature in the electrode chamber 9 detected by the temperature sensor and the moisture concentration of the exhaust gas detected by the moisture concentration sensor, as to whether the possibility that the moisture in the exhaust gas introduced through the communication passages 10 will condense in the electrode chamber 9 is high.

Here, note that the moisture concentration of the exhaust gas introduced into the electrode chamber 9 through the communication passages 10 can be estimated even if any moisture concentration sensor is not provided. In cases where such a moisture concentration is estimated, an amount of moisture generated by the combustion of an air-fuel mixture is calculated based on the air fuel ratio of the air-fuel mixture which is supplied to the internal combustion engine for combustion therein, and the moisture concentration of the exhaust gas discharged from the internal combustion engine is calculated based on the amount of moisture thus calculated and the flow rate of the exhaust gas. Moreover, the moisture concentration of the exhaust gas introduced into the electrode chamber 9 through the communication passages 10 is calculated based on the moisture concentration of the exhaust gas discharged from the internal combustion engine, and the temperature and pressure of the exhaust gas in the vicinity of the connection portions of the communication passages 10 in the exhaust pipe 2.

DESCRIPTION OF THE REFERENCE SIGNS

1 . . . electrically heated catalyst (EHC)
3 . . . catalyst carrier
4 . . . case
5 . . . mat
6 . . . inner pipe
7 . . . electrodes
9 . . . electrode chamber
10 . . . communication passages
11 . . . communication control valves

The invention claimed is:

1. An electrically heated catalyst which is arranged in an exhaust passage of an internal combustion engine, said catalyst comprising:

a heat generation element that is electrically energized to generate heat so that a catalyst is heated by the generation of heat;

a case that receives said heat generation element therein;

an insulating member that is arranged between said heat generation element and said case to support said heat generation element and to insulate electricity;

electrodes that are connected to said heat generation element through an electrode chamber which, in the final assembly of said electrically heated catalyst, is a space located between an inner wall surface of said case and an outer peripheral surface of said heat generation element, and which has a side wall surface formed by said insulating member, said electrodes supplying electricity to said heat generation element; and a communication passage that has one end thereof directly connected to said electrode chamber, and the other end thereof connected to a portion of an exhaust system of the internal combustion engine, which is other than a portion thereof in which the electrically heated catalyst is arranged, and that provides communication between a portion of an exhaust system of the internal combustion engine, which is other than a portion thereof in which the electrically heated catalyst is arranged, and said electrode chamber.

2. The electrically heated catalyst as set forth in claim 1, wherein said communication passage provides communication between a portion of the exhaust passage at the downstream side of the electrically heated catalyst and said electrode chamber.

3. The electrically heated catalyst as set forth in claim 1, wherein said communication passage is arranged in plurality.

4. The electrically heated catalyst as set forth in claim 2, wherein said communication passage is arranged in plurality.

* * * * *